(12) United States Patent
Nauen

(10) Patent No.: US 11,774,560 B2
(45) Date of Patent: Oct. 3, 2023

(54) METHOD FOR OPERATING A SENSOR ARRANGEMENT HAVING AT LEAST TWO LIDAR SENSORS AND SENSOR ARRANGEMENT

(71) Applicant: OSRAM Beteiligungsverwaltung GmbH, Grünwald (DE)

(72) Inventor: Andre Nauen, Regensburg (DE)

(73) Assignee: OSRAM BETEILIGUNGSVERWALTUNG GMBH, Regensburg (DE)

( * ) Notice: Subject to any disclaimer, the term of this patent is extended or adjusted under 35 U.S.C. 154(b) by 277 days.

(21) Appl. No.: 16/766,773

(22) PCT Filed: Nov. 6, 2018

(86) PCT No.: PCT/EP2018/080303
§ 371 (c)(1),
(2) Date: May 26, 2020

(87) PCT Pub. No.: WO2019/110222
PCT Pub. Date: Jun. 13, 2019

(65) Prior Publication Data
US 2021/0011129 A1 Jan. 14, 2021

(30) Foreign Application Priority Data

Dec. 6, 2017 (DE) ...................... 10 2017 222 043.0

(51) Int. Cl.
*G01S 7/486* (2020.01)
*G01S 17/10* (2020.01)
(Continued)

(52) U.S. Cl.
CPC ............. *G01S 7/486* (2013.01); *G01S 7/4811* (2013.01); *G01S 17/10* (2013.01); *G01S 17/931* (2020.01)

(58) Field of Classification Search
CPC ...... G01S 7/486; G01S 17/931; G01S 7/4811; G01S 17/10
See application file for complete search history.

(56) References Cited

U.S. PATENT DOCUMENTS

| 2007/0115454 | A1* | 5/2007 | Schanz .................. G01S 7/481 356/28 |
| 2017/0082737 | A1* | 3/2017 | Slobodyanyuk ........ G01S 7/497 |
| 2017/0094248 | A1 | 3/2017 | Kashyap |

FOREIGN PATENT DOCUMENTS

| DE | 10342836 A1 | 4/2005 |
| DE | 102015101722 A1 | 8/2015 |

(Continued)

OTHER PUBLICATIONS

Knoll, Bernhard, International Search Report and Written Opinion of the International Searching Authority, for counterpart application PCT/EP2018/080303, dated Feb. 12, 2019, European Patent Office, Rijswijk, The Netherlands, 16 pages.

(Continued)

*Primary Examiner* — Jamil Ahmed
(74) *Attorney, Agent, or Firm* — Slater Matsil, LLP

(57) ABSTRACT

The disclosure relates to a method for operating a sensor arrangement including a first LIDAR and at least a second LIDAR sensor, wherein the first LIDAR sensor and the second LIDAR sensor(s) each repeatedly carry out measurements, wherein the measurements of the first and the second LIDAR sensors are carried out in respective first and second measuring time windows, at the beginning of which respective measurement beams are emitted by the first and the second LIDAR sensors and a check is made as to whether at least one reflected beam portion of the respective measurement beams is detected within the respective measuring first or second time windows.

18 Claims, 2 Drawing Sheets

(51) Int. Cl.
*G01S 17/931* (2020.01)
*G01S 7/481* (2006.01)

(56) References Cited

FOREIGN PATENT DOCUMENTS

EP          3232224 A1   4/2017
WO    2017059961 A1   4/2017

OTHER PUBLICATIONS

Langer, Reinhard, German Search Report, for counterpart application DE 10 2017 222 043.0, Sep. 6, 2018, 8 pages.
Du, et al., "Laser Detection of Remote Targets Applying Chaotic Pulse Position Modulation," Optical Engineering, vol. 54, 2015, Nr. 11, 114102.—ISSN 0091-3286, 10 pages.
Rieger, et al., "Resolving Range Ambiguities in High Repetition Rate Airborne LIDAR Applications," Electro-optical Remote Sensing, Photonic Technologies, and Applications V, Sep. 29 & 21-22, 2011, Prague Czech, Republic., Bellingham, Wash. : SPIE, 2011 (Proceedings of SPIE; 8186). 9 S. (81860A).—ISBN 978-0-8194-8814-5, 10 pages.

* cited by examiner

METHOD FOR OPERATING A SENSOR ARRANGEMENT HAVING AT LEAST TWO LIDAR SENSORS AND SENSOR ARRANGEMENT

CROSS-REFERENCE TO RELATED APPLICATIONS

The present application is a National Stage application of, and claims priority, and the benefit of International Application No. PCT/EP2018/080303, filed Nov. 6, 2018, entitled "VERFAHREN ZUM BETREIBEN EINER SENSORANORDNUNG MIT MINDESTENS ZWEI LIDAR-SENSOREN UND SENSORANORDNUNG", which claims priority, and the benefit of German Application No. 10 2017 222 043.0, filed Dec. 6, 2017, entitled "VERFAHREN ZUM BETREIBEN EINER SENSORANORDNUNG MIT MINDESTENS ZWEI LIDAR-SENSOREN UND SENSORANORDNUNG", the entire contents of which are hereby incorporated by reference.

The invention relates to a method for operating a sensor arrangement comprising a first LIDAR sensor and at least one second LIDAR sensor, wherein the first LIDAR sensor and the second LIDAR sensor each repeatedly carry out measurements, wherein the measurements of the first LIDAR sensor are carried out in respective the first measurement time windows, at the beginning of which a first measurement beam is emitted by the first LIDAR sensor and it is checked whether at least one reflected beam portion of the first measurement beam is detected within the respective first measurement time window. In addition, the measurements of the at least one second LIDAR sensor are carried out in the respective second measurement time windows, at the beginning of which a second measurement beam is emitted by the at least one second LIDAR sensor and a check is made as to whether at least one reflected beam portion of the second measurement beam is detected within the respective second measurement time window. The invention also includes a sensor arrangement with a first LIDAR sensor and at least one second LIDAR sensor.

A LIDAR (Light Detection and Ranging) sensor is understood in particular to mean a system which, in addition to one or more emitters for emitting light beams, for example in pulsed form, and a detector for detecting possible reflected beam portions can additionally comprise other devices, for example optical elements such as lenses and/or a MEMS mirror, and other electrical devices. A LIDAR sensor can therefore also be referred to as a LIDAR system or LIDAR detection system.

The function of a LIDAR sensor, or LIDAR system, is based on a propagation time measurement of emitted light signals. If these impinge on surfaces in the vicinity of the LIDAR sensor, a portion of the emitted power is reflected in the direction of the LIDAR sensor. Accordingly, the pulse echo can be recorded with a suitable detector. If the pulse is emitted at a first time and the echo signal is acquired at a later, second time, the distance to the reflecting surface can be calculated from the propagation time, which is given by the difference between the first and second times. A LIDAR sensor usually works with light pulses that have a specific wavelength, for example 905 nanometers, and a specific pulse length. In addition, each light pulse is typically assigned a measurement time window, which begins with the emission of the measurement light pulse. If objects that are very far away are to be detected by a measurement, such as objects at a distance of 300 meters, then this measurement time window, within which it is checked whether at least one reflected beam portion has been received, must last for at least two microseconds. The use of LIDAR sensors is now increasingly being used in the automotive sector. Accordingly, LIDAR sensors are increasingly being installed in motor vehicles. For example, if a car has two LIDAR sensors, for example at the front of the vehicle, it can occur that the echo signals of a first of the two LIDAR sensors are received by the second of the two LIDAR sensors, regardless of the precise configuration of the fields of view of the two LIDAR sensors. This would cause inaccuracies in the individual measurements. The problem is present, in particular, when multiple identical systems or LIDAR sensors are used together, since they operate at very similar measurement frequencies. This can eventually lead to the detection of phantom objects at positions where there are actually no objects present at all. This can in turn result in highly safety-critical situations, for example, because a driver assistance system in a vehicle could trigger an unnecessarily sharp braking action or initiate an evasive maneuver, which could endanger both the occupants of the vehicle as well as other road users.

The object of the present invention is therefore to provide a method for operating a sensor arrangement, and a sensor arrangement having a first LIDAR sensor and at least one second LIDAR sensor, in which the probability of mutual interference is reduced.

This object is achieved by means of a method for operating a sensor arrangement and by a sensor arrangement having the features in accordance with the respective independent claims. Advantageous embodiments of the invention are the subject matter of the dependent claims, the description and the figures.

In a method according to the invention for operating a sensor arrangement comprising a first LIDAR sensor and at least one second LIDAR sensor, the first LIDAR sensor and the at least one second LIDAR sensor each repeatedly perform respective measurements. The measurements of the first LIDAR sensor are carried out in respective first measurement time windows, at the beginning of which a first measurement beam is emitted by the first LIDAR sensor and a check is made as to whether at least one reflected beam portion of the first measurement beam is detected within the respective first measurement time window. In addition, the measurements of the at least one second LIDAR sensor are carried out in respective second measurement time windows, at the beginning of which a second measurement beam is emitted by the at least one second LIDAR sensor and a check is made as to whether at least one reflected beam portion of the second measurement beam is detected within the respective second measurement time window. The first and the at least one second LIDAR sensor are operated in a synchronized manner in such a way that the first measurement time windows and the second measurement time windows do not overlap temporally.

Due to the temporal synchronization of the two LIDAR sensors and the resultant temporal separation of the respective measurement time windows this provides, it is advantageously ensured that the probability of a mutual interference occurring between the two LIDAR sensors is significantly reduced. For example, the first LIDAR sensor firstly emits a measurement pulse or a first measurement beam and then the detector of the first LIDAR sensor is read out for the duration of the first measurement time window to check whether a reflected beam portion has been detected. During this time interval, the second LIDAR sensor, or any other LIDAR sensor that is operated in a synchronized manner with the first LIDAR sensor in the same way as the second LIDAR sensor, cannot emit a light pulse or a second measurement beam. Only when the duration of the first measurement time window has elapsed can the at least one second LIDAR sensor emit a measurement beam. Then, again for the duration of the second measurement time window, the detector of the second LIDAR sensor is read out and a check is made as to whether a reflected beam portion has been detected. However, during this period of the second measurement time window, neither the first LIDAR sensor nor any other LIDAR sensor of the synchronized sensor arrangement can emit a measurement beam. Accordingly, the probability that a beam portion of a measurement beam of another LIDAR sensor is received in respective measurement time windows is significantly reduced. In particular, this would only be possible if this interfering measurement beam from another LIDAR sensor had traveled a significantly further distance than the actual light beam to be detected. For example, if the two LIDAR sensors are designed to cover a range of 300 meters, the first and second measurement time windows must last for at least two microseconds. If the first measurement time window were to be directly followed by a second measurement time window, it would only be possible for the second LIDAR sensor to detect a portion of the first measurement beam if this measurement beam had traveled a distance of more than 600 meters. At such distances, however, an emitted light pulse is attenuated by various reflections and absorptions in such a way that the interference beam portion detected by the second detector would only have an extremely low signal level, which is then barely noticeable or can be filtered out in a similar way to noise signals, for example by a suitable thresholding method or by averaging consecutive individual measurements of the second LIDAR sensor.

Thus, it is now advantageously possible to avoid mutual interference between two or more LIDAR sensors from the outset by synchronizing their respective time bases. Another advantage obtained is that the facility is provided to improve the combined performance of the LIDAR sensor cluster by operating all LIDAR sensors as a synchronized ensemble, which will be explained in more detail later.

In an advantageous embodiment of the invention, a synchronization signal is repeatedly provided, by means of which the operation of the first and the at least one second LIDAR sensor is synchronized. LIDAR sensors usually comprise timers from which the measurement sequence is derived. Such timers therefore determine when a respective measurement time window of a LIDAR sensor is started and ended and when the next measurement time window begins. To synchronize the first and the at least one second LIDAR sensor, such internal timers can then be synchronized with one another, which is carried out repeatedly, for example if the sensor arrangement is used in a motor vehicle, whenever the respective vehicle is started, or at regular predefined intervals depending on the accuracy of the timers. Furthermore, the respective LIDAR sensors, i.e. the first LIDAR sensor and the at least one second LIDAR sensor, have a communication interface via which the synchronization information can be exchanged. The timers can also be internal oscillators, the frequency deviations or jitter of which should be negligible compared to the desired distance measurement accuracy. Based on typical pulse widths, it is advantageous if the stability is better than one nanosecond, in particular over a period of time during which no re-synchronization occurs.

In conjunction with a common interface, it would also be possible to have the measurement phase of each individual LIDAR sensor triggered by a central entity. However, internal timers are preferred, as this allows the required data transfer rates to be kept lower.

Depending on the stability of the internal timers, it is sufficient to synchronize the time base only, for example, on starting the vehicle. But it is also quite possible to perform a re-calibration, for example every ten minutes, in view of the required data rate on a vehicle bus. If the vehicle is stationary, or in general in the event of a stationary sensor arrangement, it is also possible to synchronize the respective LIDAR sensors with each other optically, for example by a LIDAR sensor previously defined as the master emitting a specific calibration sequence into the environment, so that neighboring LIDAR sensors can adjust to it accordingly.

In addition, the first and the at least one second LIDAR sensor can be operated in a synchronized manner in such a way that the first and second measurement time windows are arranged temporally in a specified sequence with respect to each other. This is a particularly simple form of the method. However, the first and the at least one second LIDAR sensor can also be operated in a synchronized manner in such a way that the first and second measurement time windows are arranged temporally in a random sequence with respect to each other. This is particularly advantageous when the sensor arrangement comprises more than two LIDAR sensors. Such a random sequence can be linked to other constraints, for example that no two measurement time windows of the same sensor should occur consecutively in this temporal sequence, such as two first measurement time windows or two second measurement time windows. A stochastic or random sequence of the measurement time windows of the respective LIDAR sensors of the sensor arrangement has the advantage that artifacts can be avoided, for example, during a subsequent data fusion or image synthesis process.

In a further advantageous design of the invention, respective successive first measurement time windows are spaced apart from each other by a first predefined time interval, which is many times greater than that of a first measurement time window. As mentioned above, a measurement time window of two microseconds is required for a range of 300 meters. The pulse frequency of standard LIDAR sensors is normally in a range below 100 kilohertz, which is due to thermal limitations of the light sources used, such as laser diodes emitting at 905 nanometers. At higher pulse frequencies, the pulse output power would decrease too much—in particular at temperatures above 60 degrees Celsius that are relevant in the vehicle. Even with a measurement time of two microseconds, the number of maximum measurement phases within one second is limited by the pulse rate of the laser diode. The provision of a minimum temporal distance between respective first consecutive measurement time windows therefore has the great advantage that a specific pulse frequency, which is determined primarily by the thermal loading capacity of the light sources used, is not exceeded. This minimum time interval can therefore be advantageously determined as a function of the light sources used, and thus always ensures a particularly efficient operation of the LIDAR sensor. This also applies not only to the first LIDAR sensor, but also to the at least one second LIDAR sensor. Similarly, the second measurement time windows are preferably also spaced apart by a minimum time interval.

From the fact that dead times must usually be observed between respective measurement time windows of a LIDAR sensor anyway, another great advantage of the invention immediately becomes clear. The synchronization of the time bases in such a way that the respective measurement time windows of the individual LIDAR sensors do not overlap temporally does not in any way affect the measurements of the individual LIDAR sensors, since dead times must be observed anyway. At a pulse frequency of 100 kilohertz, for example, a measurement beam is thus emitted every ten microseconds. If the duration of a measurement time window is two microseconds, in principle five LIDAR sensors can be multiplexed without any restriction. If a larger number of LIDAR sensors were required for the sensor arrangement, then, for example, the measurement duration of the individual measurement, i.e. the length of the individual measurement time windows, can be reduced and thus also the maximum range. Halving the range from 300 meters to 150 meters, which is sufficient for most applications anyway, would allow twice the number of synchronized LIDAR sensors, i.e. ten.

Furthermore, it can also be provided that a temporal length of the respective first and/or second measurement time windows is dynamically varied as a function of a distance to an object detected during a measurement. This has several advantages: it means that the respective measurement time windows cannot be dimensioned longer than necessary, so that they can be shortened if the situation permits, which means that the distances between the first and second measurement time windows increase for a constant pulse frequency. This in turn further reduces the probability that a light pulse from the second LIDAR sensor will be received by the first LIDAR sensor in the first time window and vice versa. Another advantage is that, for example, the number of active LIDAR sensors in the sensor arrangement can also be dynamically adjusted depending on the length of the measurement time windows. For example, if a detection range of 300 meters is required, five LIDAR sensors can contribute to the measurement at a pulse frequency of 100 kilohertz. In another situation, by contrast, if a range of 150 meters is sufficient, the number of LIDAR sensors contributing to the measurement can be increased to ten while keeping the pulse frequency constant. Thus, for example, particularly for very short ranges the resolution can be increased by adding additional LIDAR sensors.

Alternatively, it may also be provided that the temporal length of the respective first and/or second measurement time windows is fixed and constant. This is a particularly simple design, which is particularly advantageous when the sensor arrangement already comprises few LIDAR sensors, for example less than five or a maximum of five.

In addition, it is also possible, of course, that a temporal length of the respective first and/or second measurement time window is determined depending on the number of LIDAR sensors in the sensor arrangement. For example, this temporal length can also be set as a maximum temporal length of the respective measurement time windows, so that the individual measurement time windows are nevertheless dynamically varied, depending on the distance of an object detected during a previous measurement, for example. This provides many advantageous ways of adapting the length of the measurement time windows to the situation and to the requirements of the sensor arrangement.

However, the great advantage of the invention lies not only in the reduction of the susceptibility to interference, but above all in the capability of improving the performance of the entire system, i.e. the sensor arrangement. This is because the individual LIDAR sensors, the time bases of which are synchronized with each other, can effectively be combined into a more powerful overall system. For example, if a LIDAR sensor knows which of the other LIDAR sensors in the sensor arrangement emits a pulse and when, and if that LIDAR sensor also knows the relative position with respect to the other LIDAR sensors, this LIDAR sensor of a synchronized cluster can also use measurement echoes which originate from the other LIDAR sensors, but LIDAR sensors operating in a synchronized manner, for a time-of-flight measurement, for example. A single LIDAR sensor of the sensor arrangement can thus also use the measurement pulses of the other LIDAR sensors of the sensor arrangement to obtain additional information about the environment.

Therefore, a particularly advantageous design of the invention is one in which the first LIDAR sensor has a first detector which is read out during the first measurement time windows, and the second LIDAR sensor has a second detector which is read out during the respective second measurement time windows, the first detector also being read out during the respective second measurement time windows, and if a light pulse is detected by the first LIDAR sensor within one of the second measurement time windows, the detected light pulse is classified as originating from the second LIDAR sensor. Thus, the first LIDAR sensor can also advantageously use the light pulses originating from the at least one second LIDAR sensor and obtain additional information about the environment based on them. Conversely, this also applies to the second LIDAR sensor, because this is also able to read out its detector during the first measurement time window and, if a light pulse is detected by the second LIDAR sensor within this first measurement time window, the second LIDAR sensor can classify this detected light pulse as coming from the first LIDAR sensor and thereby acquire additional information about the environment. This allows many advantages to be achieved and greatly improves the overall performance of the sensor arrangement as a whole. This additional information obtained from the respective LIDAR sensors can be used to increase the resolution of the environment sensing, on the one hand, or to improve the signal-to-noise ratio of the respective measurements, on the other. Overall, this can provide a much improved and more robust sensing of the environment.

It is therefore particularly advantageous if the first LIDAR sensor uses the data read out during the first measurement time windows in addition to the data read out during the second measurement time windows for environment sensing. This allows the benefits described above to be achieved. The same applies to the at least one second LIDAR sensor and to every other LIDAR sensor of the synchronized sensor arrangement.

For example, it can be provided that in the event of a light pulse being detected by the first LIDAR sensor during at least one second measurement time window, a position of an object point is determined on the basis of the detected light pulse and as a function of a position of the second LIDAR sensor relative to the first LIDAR sensor. This design can also apply analogously to the second LIDAR sensor and also to every other LIDAR sensor in the sensor arrangement. For example, if two LIDAR sensors are used, twice as many object points can be detected in one measurement interval. The resolution therefore increases in proportion to the number of LIDAR sensors used in the sensor arrangement. This also effectively allows the pulse rate from which an environmental image can be generated to be increased. In particular, this effective pulse rate also increases in proportion to the number of LIDAR sensors in the sensor arrangement.

A further particularly significant advantage of this sensor arrangement can be seen from the following example. For example, there are surfaces that essentially exhibit a specular reflex, of which a mirror would be the extreme example. In such a case, a LIDAR sensor, if it does not emit a light pulse exactly perpendicular to the surface of the object, is not able to receive an echo signal at all and is thus blind to the reflecting object. However, by using a plurality of synchronized LIDAR sensors in a cluster, as is the case according to the invention, it is now also advantageously possible in such a case to increase the probability that at least one or other of the other LIDAR sensors can still receive an echo from such a reflecting object, so that the cluster would not be blind to this particular object. The sensor arrangement can thus also significantly increase the reliability of the sensing of the environment.

In order for a particular LIDAR sensor, for example the first LIDAR sensor, of the sensor arrangement to be able also to adequately evaluate the pulses received from other LIDAR sensors, it is advantageous not only to have knowledge of the relative positions to the other LIDAR sensors, but also to know from which direction this extraneous pulse arrived at the detector of the first LIDAR sensor. This information can now be obtained in a wide variety of ways and depends on the design of the individual LIDAR sensors. It is therefore advantageous if the position of an object point is additionally determined as a function of solid angle information. Based on this solid angle information, it is thus possible to determine the direction in which the object is located as seen from the receiving LIDAR sensor, for example the first LIDAR sensor. This solid angle information can be provided, for example, by a radiation direction of the second LIDAR sensor during the relevant second measurement time window. Alternatively or in addition, the angle information can also be acquired by the detector of the first LIDAR sensor. Of course, both of these can be the case, which makes the determination of the solid angle information even more reliable. The LIDAR sensor and/or the at least one second LIDAR sensor can also be designed, for example, as a flash LIDAR, which generates its resolution exclusively by means of the detector, which in this case consists of a plurality of individually readable segments arranged in a matrix. In other words, solid angle information can be assigned to a received light pulse depending on which pixel of the matrix detected this pulse. Thus, if the first LIDAR sensor detects a pulse from the second LIDAR sensor in a second measurement time window, the first LIDAR sensor, if it is implemented as a flash LIDAR, can itself determine the direction from which this pulse was received. The first and/or at least one second LIDAR sensor can also be designed as a raster LIDAR, which has an emitter that emits the measurement light pulses selectively in different spatial directions, in particular sequentially in time, wherein a single segment is also sufficient as a detector here. For example, if the first and/or second LIDAR sensor are now designed as such a raster LIDAR and if the first LIDAR sensor receives, for example, a pulse from the second LIDAR sensor in a second measurement time window, then, for example, information about the spatial direction in which the second LIDAR sensor emitted this pulse can be communicated to the first LIDAR sensor so that this first LIDAR sensor can advantageously use this information for the evaluation. In addition, the first LIDAR sensor and/or the at least one second LIDAR sensor can also be designed as a combination of both LIDAR types, for example, in such a way that a raster motion occurs in one dimension, but the resolution in the second dimension is achieved by means of a detector that is angle-sensitive in this dimension. In this case, the solid angle information required by the first LIDAR sensor in one dimension can thus provide via the light pulse received by the second LIDAR sensor itself and in the other dimension, for example, receive from the second LIDAR sensor.

In addition, the invention relates to a sensor arrangement comprising a first LIDAR sensor and at least one second LIDAR sensor, wherein the first LIDAR sensor and the at least one second LIDAR sensor are each designed to repeatedly carry out respective measurements in such a way that the measurements of the first LIDAR sensor are carried out in respective first measurement time windows, at the beginning of which a first measurement beam is emitted by the first LIDAR sensor, and a check is made as to whether at least one reflected beam portion of the first measurement beam is detected within the respective first measurement time window, and the measurements of the at least one second LIDAR sensor are carried out in respective second measurement time windows, at the beginning of which a second measurement beam is emitted by the at least one second LIDAR sensor and a check is made as to whether at least one reflected beam portion of the second measurement beam is detected within the respective second measurement time window. Furthermore, the sensor arrangement is designed to synchronize the first and the least one second LIDAR sensor in such a way that the first measurement time windows and the second measurement time windows do not overlap temporally.

The advantages mentioned with regard to the method according to the invention and its embodiments apply in the same way to the sensor arrangement according to the invention. In addition, the processing steps described in connection with the method according to the invention and its embodiments enable the further refinement of the sensor arrangement according to the invention by means of other material features.

Furthermore, the first and/or at least one second LIDAR sensor can be designed be designed to emit light pulses with a wavelength that is preferably in the range between 850 nanometers and 1,600 nanometers. For example, the light pulses can have a wavelength of 905 nanometers or 1,064 nanometers or 1,548 nanometers. Longer wavelengths are also possible, such as 5,600 nanometers or 8,100 nanometers. In principle, however, the light pulses can have shorter wavelengths such as 600 nanometers, 650 nanometers, 700 nanometers, 750 nanometers, or 800 nanometers. Furthermore, the first and/or the at least one second LIDAR sensor can be designed to emit light pulses with a frequency between one kilohertz and one megahertz, preferably with a frequency of less than 100 kilohertz. In addition, the detection range of the first and/or the at least one second LIDAR sensor can range from a few centimeters, for example 20 centimeters, up to 300 meters, and possibly even further. Accordingly, the measurement time windows can last two microseconds, for example, which corresponds to the propagation time of a light pulse that is reflected at an object 300 meters away. However, the respective measurement time windows do not necessarily always need to remain the same, but can also be dynamically adjusted to the distance of recently detected objects, as already described. The individual light pulses can have a length between one and 100 nanoseconds, preferably a length of a few nanoseconds, such as one nanosecond, five nanoseconds, ten nanoseconds, 15 nanoseconds, 20 nanoseconds, and so on, but particularly preferably less than five nanoseconds. In addition, depending on the exemplary embodiment the emitter of the first and/or at least one second LIDAR sensor can consist of either a single emitter or a one- or two-dimensional emitter matrix, each part of which can be individually controlled. In principle, both strip emitters and VCSEL types, e.g. VCSEL and VECSEL, in other words surface emitters, can be used. The light source emitters can therefore be provided in principle both as LEDs and as laser diodes. The individual light pulses emitted by such an emitter can have a power in the range of several milliwatts (VCSEL) and between 30 Watt and 200 Watt (VECSEL).

The sensor arrangement according to the invention or one of its embodiments are preferably used in a motor vehicle. Accordingly, a motor vehicle having a sensor arrangement according to the invention or one of its embodiments is also intended to be part of the invention. In the case of a motor vehicle according to the invention having a sensor arrangement or one of its embodiments, the first and the at least one second LIDAR sensor may be arranged anywhere on the vehicle, in particular on the outside of the vehicle, for example, in one or more headlamps of the vehicle, generally on the front of the vehicle, at the rear of the vehicle, on the passenger and/or driver's side, or even on the roof of the motor vehicle. The individual fields of view assigned to the first and the at least one second LIDAR sensor can also be oriented in any direction with respect to the motor vehicle, for example facing forwards, to the rear, to the side, or even upwards. The individual fields of view may or may not overlap. All these LIDAR sensors which are part of the sensor arrangement are operated in a synchronized manner as described. In addition, however, the motor vehicle may also have one or more other LIDAR sensors that are not part of the sensor arrangement, which are then operated in a manner that is not synchronized with the LIDAR sensors of the sensor arrangement. This is possible, for example, if the LIDAR sensors of the sensor arrangement are arranged on the front of the vehicle and another LIDAR sensor, which is not synchronized with the LIDAR sensors arranged on the front of the vehicle, is arranged on the rear of the vehicle. In this case, the probability of mutual interference or disturbance is already low.

In principle, however, there are no limits to the application areas of the sensor arrangement according to the invention or its embodiments. The arrangement can thus also be used, for example, in airplanes, drones, ships, trains, lighthouses, movable lighting equipment in the entertainment and studio lighting sector, or similar applications.

BRIEF DESCRIPTION OF THE DRAWINGS

Further advantages, features and details of the invention arise from the claims, the following description of preferred embodiments and from the drawing.

In the following, the invention will be explained in further detail based on exemplary embodiments.

DETAILED DESCRIPTION

Figure 1:
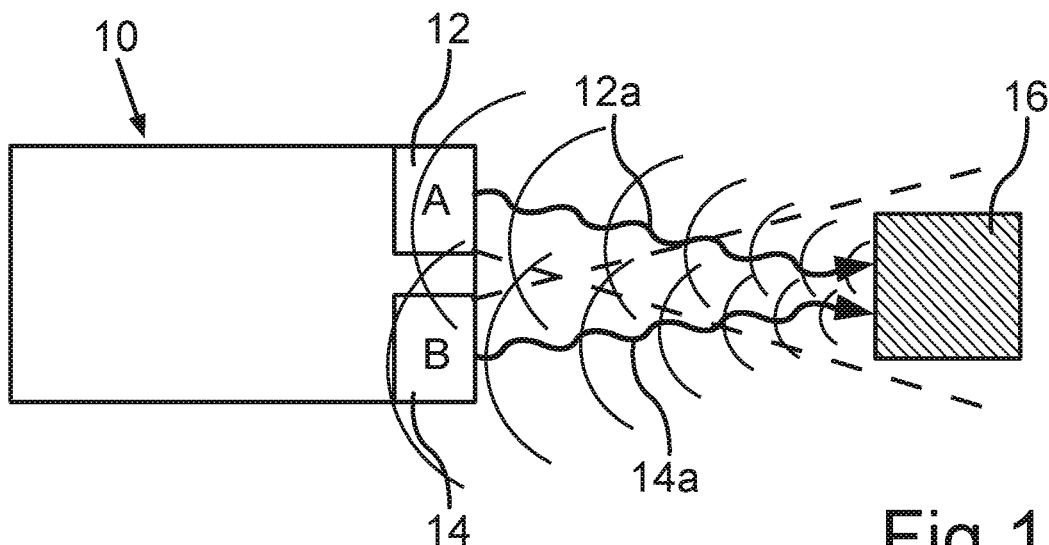
FIG. 1 shows a schematic illustration of a motor vehicle having two LIDAR sensors according to the prior art.

FIG. 1 shows a schematic illustration of a motor vehicle 10 having two LIDAR sensors 12, 14 according to the prior art. Both LIDAR sensors 12, 14 are mounted on the front of the vehicle. In this example, both LIDAR sensors 12, 14 emit a measurement pulse 12a, 14a. This strikes an object 16, which reflects and scatters the incident light. Accordingly, after its reflection the measurement pulse 12a emitted by the first LIDAR sensor 12 is also received by the second LIDAR sensor 14 as a reflected measurement pulse 14a, and vice versa. This is possible, in particular, regardless of whether the fields of view of both LIDAR sensors 12, 14 overlap or not.

According to the invention, mutual interference between two or more LIDAR systems or LIDAR sensors can be advantageously prevented by synchronizing the operation of the respective LIDAR sensors so that the respective measurement time windows of these LIDAR sensors do not overlap.

This will now be explained in more detail by reference to the subsequent figures.

Figure 2:
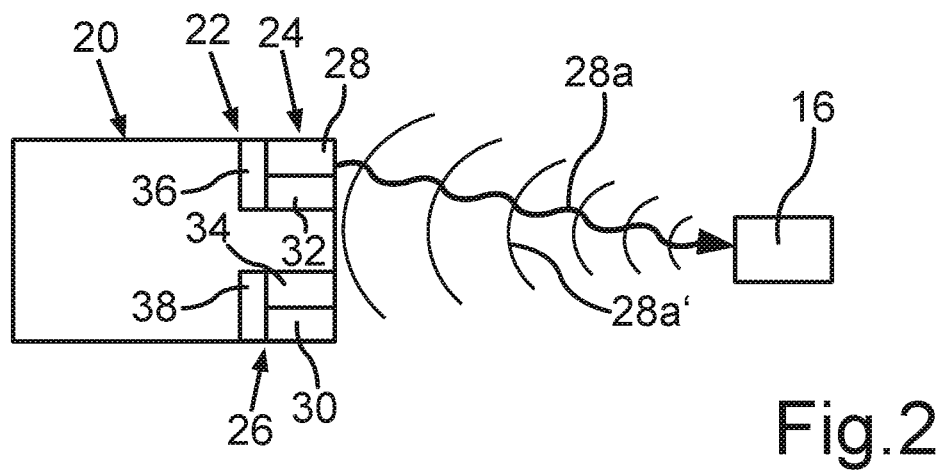
FIG. 2 shows a schematic representation of a motor vehicle having a sensor arrangement during a first measurement time window, in accordance with an exemplary embodiment of the invention.
Figure 3:
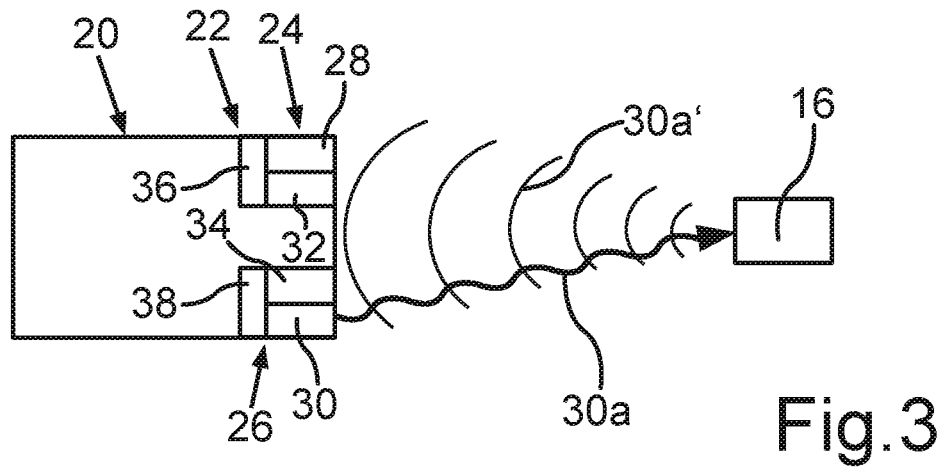
FIG. 3 shows a schematic representation of a motor vehicle having a sensor arrangement during a second measurement time window, in accordance with an exemplary embodiment of the invention.

To this end, FIG. 2 and FIG. 3 each show a schematic representation of a motor vehicle 20 having a sensor arrangement 22 according to an exemplary embodiment of the invention. FIG. 2 shows a measurement situation during a first measurement time window M1 (compare FIG. 4) and FIG. 3 shows a measurement situation during a second measurement time window M2 (compare FIG. 4). The sensor arrangement 22 comprises two LIDAR sensors 24, 26, which in this example are again arranged on the front of the vehicle, for example, integrated into a front headlamp of the motor vehicle 20. In general, the first and the at least one second LIDAR sensor 24, 26 can be arranged at any position on the motor vehicle 20, in particular on the outside of the vehicle 20, for example on the front of the vehicle, at the rear of the vehicle 20, on the front passenger and/or driver's side, or even on the roof of the vehicle. The individual fields of view 24, 26 assigned to the first and the at least one second LIDAR sensor 24, 26 can also be aligned in any direction with respect to the motor vehicle 20, for example facing forwards, to the rear, to the side, or even upwards. The individual fields of view may or may not overlap. One of these LIDAR sensors has an emitter 28, 30 and a detector 32, 34. The respective emitters 28, 30 are designed to repeatedly emit a measurement beam 28a, 30a, while the respective detector 32, 34 is designed to capture at least part of the reflected measurement beam 28a', 30a', which is reflected back due to reflection and scattering at an object 16. Furthermore, the respective emitters 28, 30 are designed to emit the respective measurement beam 28a, 30a in pulsed form. Each light pulse 28a, 30a is emitted at the beginning of a respective measurement time window. During these respective measurement time windows, a check is then made as to whether the beam portion 28a', 30a' was detected by the respective detector 32, 34. In order to control this pulse emission and also to evaluate the received signals, each LIDAR sensor 24, 26 has a control device 36, 38.

To avoid mutual interference between these LIDAR sensors 24, 26, the sensor arrangement 22 is now advantageously designed such that the two LIDAR sensors 24, 26 are operated in a synchronized manner, so that the respective measurement time windows M1, M2 of the first LIDAR sensor 24 and of the second LIDAR sensor 26 do not overlap temporally. During the first measurement time window M1, as shown in FIG. 2, the emitter 28 of the first LIDAR sensor 24 emits a measurement pulse 28a and later on in this measurement time window M1 a check is made as to whether a part of the emitted measurement pulse 28a has been received by the first detector 32 of the first LIDAR sensor 24 in the form of the reflected beam portion 28a'. However, during this first time window M1, no measurement beam is emitted by the second LIDAR sensor 26. Thus, a measurement beam 30a can only be emitted by the second LIDAR sensor 26 after the first measurement time window M1 has ended. This situation is shown in FIG. 3. FIG. 3 then shows the same situation as in FIG. 2, except during the second measurement time window M2, which begins with the emission of a light pulse 30a by the second LIDAR sensor 26. Later during this second measurement time window M2, the second LIDAR sensor 26 checks whether at least one reflected partial beam 30a' has been received by the second detector 34 of the second LIDAR sensor 26. On the other hand, during this second time window M2 no measurement light pulse is emitted by the first LIDAR sensor 24.

Figure 4:
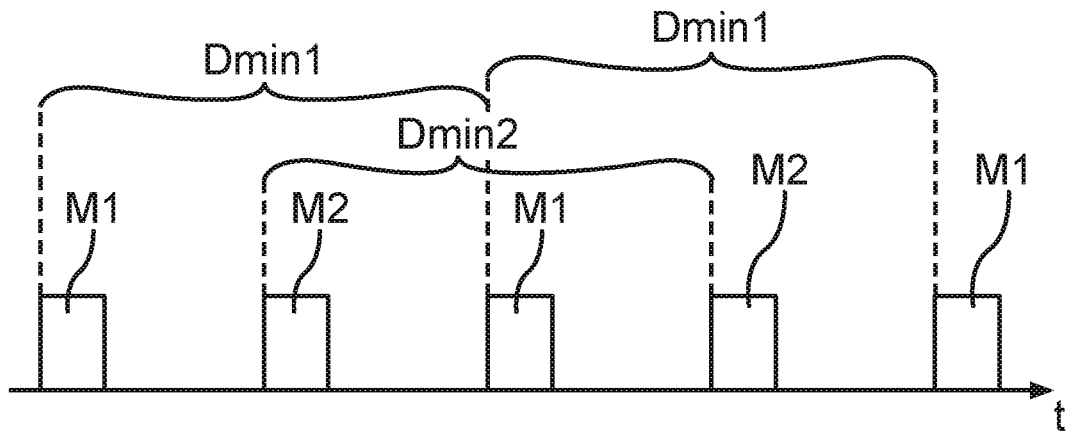
FIG. 4 shows a schematic representation illustrating a method for operating a sensor arrangement having two LIDAR sensors according to an exemplary embodiment of the invention.

This procedure can now be continued in an alternating manner, as also illustrated in FIG. 4, for example.

FIG. 4 shows a schematic representation illustrating a method for operating a sensor arrangement 22 having two LIDAR sensors 24, 26 according to an exemplary embodiment of the invention. The measurement sequences are illustrated by means of a time line on which the time t is plotted. The measurement time windows M1, M2 of the first and second LIDAR sensor 24, 26 respectively therefore alternate and do not overlap temporally. This minimizes the probability that a light pulse originating from the second LIDAR sensor 26 will be received as a reflected beam 30a' in a first measurement time window M1, and also vice versa, that a reflected beam portion 28a' of the measurement pulse 28a emitted by the first LIDAR sensor 24 will be received by the second LIDAR sensor 26 in a second measurement time window M2. In order to minimize the risk of mutual interference, the corresponding measurement time windows M1, M2 can be chosen to be sufficiently long, for example two microseconds, which would correspond to a range of 300 meters, or the respective measurement time windows can also be spaced apart temporally. Even if a part of the light pulse 28a emitted in a first measurement time window M1 were then to travel such a long distance that a reflected beam portion 28a' of the first LIDAR sensor 24 would still be received by the second LIDAR sensor 26 in the second time window M2 of the second LIDAR sensor 26, this beam portion would be so strongly attenuated that it can easily be suppressed by means of a threshold criterion, or else it is submerged in the background noise anyway.

It is also advantageous if two consecutive first measurement time windows M1 are separated from each other by a minimum time interval Dmin1, and also if two consecutive second measurement time windows M2 are separated by such a minimum time interval Dmin2. Preferably, these respective minimum time intervals Dmin1, Dmin2 are many times longer than the measurement time windows M1, M2. This is derived from the fact that a certain dead time must be maintained between the transmission of successive measurement pulses 28a, 30a by the respective LIDAR sensor 24, 26, which is conditioned by the thermal limitations of the light sources used. Accordingly, this dead time can also vary between types of light sources. For example, if the first LIDAR sensor 24 and the second LIDAR sensor 26 use different light sources, these required minimum intervals Dmin1 and Dmin2 may also be different. In order to simplify the synchronization of the time bases in such a case, the pulse frequency of the respective LIDAR sensors 24, 26 can simply be selected such that the longest required minimum interval of a relevant LIDAR sensor is maintained between the emission of two consecutive light pulses. In the case of two LIDAR sensors 24, 26 of the same design which also use the same light sources, equal values for the required minimum intervals Dmin1, Dmin2 are obtained anyway.

Since these dead times between the emission of two successive light pulses are usually significantly longer than the length of the measurement time windows M1, M2 themselves, the synchronization of the time bases of the two LIDAR sensors 24, 26 also has no effect on the measurements or the typical measurement sequence of an individual LIDAR sensor 24, 26. In other words, there is no need to accept a lower pulse rate. On the contrary, the pulse rate can even effectively be increased, because this variation of the respective measurement time windows M1, M2 not only prevents mutual interference between both LIDAR sensors 24, 26 but also enables the first LIDAR sensor 24 to additionally use the reflected beam portions 30a' of the second LIDAR sensor 26 for evaluation, as well as allowing the second LIDAR sensor 26 to use the reflected partial light beams 28a' of the first LIDAR sensor 24 for evaluation. This means that LIDAR sensors, the time bases of which are synchronized with each other, can effectively be combined into a more powerful overall system. Thus, if a given LIDAR sensor 24, 26 knows when the other of the two LIDAR sensors 24, 26 emits a measurement pulse 28a, 30a, and if the position relative to this other LIDAR sensor 24, 26 is also known, then any LIDAR sensor 24, 26 of a synchronized cluster can use measurement echoes, in other words, the reflected partial beams 28a', 30a' which originate from the other, synchronously operated, LIDAR sensors 24, 26 for a time-of-flight measurement. Accordingly, this can provide either better signal-to-noise ratios within the same total measurement time, or higher refresh rates of the environmental image.

Figure 5:
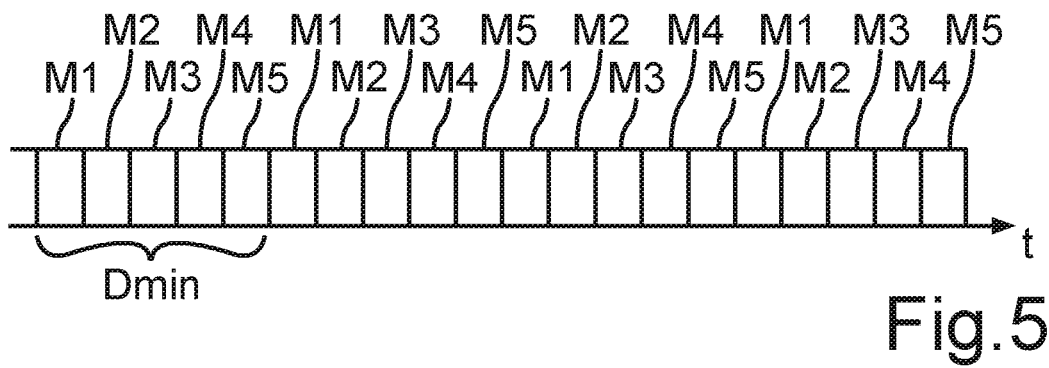
FIG. 5 shows a schematic representation for illustrating a method for operating a sensor arrangement with five LIDAR sensors in accordance with another exemplary embodiment of the invention.

In particular, the effective pulse rate increases with the number of synchronized LIDAR sensors 24, 26 of the sensor arrangement 22. In general, not only can two LIDAR sensors 24, 26 be operated in a synchronized manner, as shown here, but also significantly more than two, such as three, four, five, six, seven and so on. If, for example, a detection range of 300 meters is to be achieved and the pulse frequency is, for example, 100 kilohertz, then as many as five LIDAR sensors 24, 26 can be operated in a synchronized manner without restriction. This is shown schematically in FIG. 5. Here, M1 again refers to the measurement time windows of a first LIDAR sensor 24, M2 to those of a second LIDAR sensor 26, M3 to those of a third LIDAR sensor, M4 to those of a fourth LIDAR sensor, and M5 to those of a fifth LIDAR sensor. All are operated in a synchronized manner in such a way that their respective measurement time windows M1, M2, M3, M4, M5 do not overlap temporally. Each measurement time window M1, M2, M3, M4, M5 can last for two microseconds, allowing maximum exploitation of the required minimum time interval Dmin between any two consecutively emitted measurement pulses of a respective LIDAR sensor 24, 26.

By all means, however, a larger number of LIDAR sensors 24, 26 can also be operated in a synchronized manner in a sensor arrangement 22. For this purpose, for example, the measurement period of the individual measurement time windows M1, M2, M3, M4, M5 could then be reduced and the maximum range therefore reduced. Halving the range, for example to 150 meters, would allow twice the number of synchronized LIDAR sensors 24, 26, in this example ten. In addition, the range can also be dynamically adjusted to the distance of the objects 16 previously detected in a measurement time step. It may also be provided that if the first LIDAR sensor 24 does not receive any measurement signals associated with a relevant object 16 which can be determined, for example, by object detection and classification, the measurement time window M1 can be temporally extended to the maximum practical distance, for example 600 m. This also applies analogously to the second LIDAR sensor 26 and every other LIDAR sensor in the sensor arrangement 22. Likewise, the number of LIDAR sensors 24, 26 that are operated in a synchronized manner can be adjusted accordingly. If very long ranges are required, some of the LIDAR sensors 24, 26 can be switched to inactive, while for quite short ranges in which relatively short measurement time windows M1, M2, M3, M4, M5 are sufficient, additional LIDAR sensors 24, 26 can be recruited for synchronized operation. Also, the measurement time windows of the individual LIDAR sensors 24, 26 do not necessarily have to be repeated in the same predefined sequence, as shown here, but can also be arranged in a random or stochastic manner with respect to each other. This allows artifacts to be avoided when subsequently creating the images.

Figure 6:
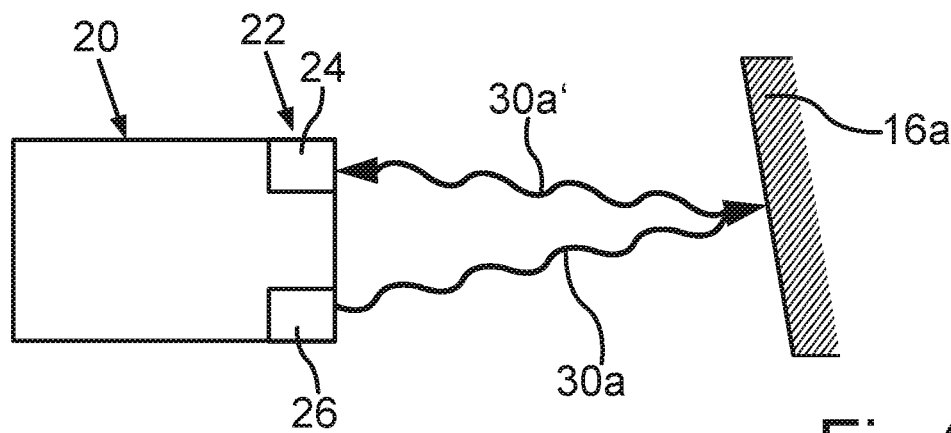
FIG. 6 shows a schematic representation of a motor vehicle having a sensor arrangement with an exemplary embodiment of the invention.

A further advantage of the invention is also illustrated in FIG. 6. Thus far, it has been assumed that all objects 16 illuminated by a LIDAR sensor 24, 26 scatter light to a greater or lesser extent. This is also a prerequisite for the fact that the more or less collimated measurement pulse, depending on the specific LIDAR sensor principle, undergoes dispersion in the angular space so that a plurality of spatially separated detectors are able to capture an echo. However, there are also surfaces, such as the exemplary object surface 16a shown here in FIG. 6, which essentially exhibit specular reflection. This means that the light pulse 30a shown here, emitted by the second LIDAR sensor 26, is reflected directionally at this surface 16a, as if at a mirror, and is thus effectively not scattered at all. This means that the reflected beam 30a' cannot be detected by the second LIDAR sensor 26 itself. In principle, this would only be possible if the emitted light beam 30a were to strike the surface 16a at right angles. In such a case, the second LIDAR sensor 26 is blind with respect to this reflecting surface 16a. A synchronized LIDAR cluster, however, as is the case in the sensor arrangement 22 according to the exemplary embodiments of the invention, increases the probability that at least one of the other LIDAR sensors, as in this example the first LIDAR sensor 24, can still detect the reflected beam 30a, so that the cluster, in other words the sensor arrangement 22, is not blind to this particular object 16a.

Optionally, additional measures can also be taken to avoid ambiguity between late echoes, self-generated measurement pulses and early pulses from composite systems. For example, a respective LIDAR sensor 24, 26 can use an individual pulse sequence consisting of at least two pulses. Preferably, sequences of two to ten pulses are used for this. By means of a cross-correlation between the measurement signal and the emitted pulse shape, which can be measured, for example, via an internal reference path, echoes from other LIDAR sensors 24, 26 can be detected as such. Such a cross-correlation method is only one example that can be used to detect an individual pulse sequence. In addition, the individual LIDAR sensors 24, 26 can also use an individual pulse shape. Specifically, this can be the pulse width or the gradients of a pulse edge. Other basic shapes might be, for example, a rectangle, a sawtooth, a triangle, a Gaussian or Lorenz curve. In this case, in addition to correlation with a reference signal, the algorithmic extraction of pulse parameters such as the edge gradient offers a good solution. It is also conceivable that the respective LIDAR sensors 24, 26 use emissions that are spectrally offset from each other. In such a case, it is advantageous if each respective LIDAR sensor 24, 26 then also has the appropriate number of receiver detectors 32, 34, which are then sensitive to a specific spectral range. By providing additional measures of this kind, it is also no longer necessary for the individual measurement time windows M1, M2, M3, M4, M5 each to have a minimum duration or spacing relative to each other in order to adequately ensure that the pulses of one LIDAR sensor 24, 26 are not also received in a measurement time window M1, M2, M3, M4, M5 of another LIDAR sensor 24, 26. If this is in fact the case, then it can be easily detected on the basis of the above-mentioned measures.

Overall, this provides a type of sensor arrangement which, by synchronization of the time bases of each LIDAR sensor, allows the likelihood of mutual interference to be minimized.

The invention claimed is:

1. A method for operating a sensor arrangement comprising a first LIDAR sensor and at least one second LIDAR sensor,
   wherein the first LIDAR sensor and the at least one second LIDAR sensor each repeatedly carry out respective measurements,
   wherein the measurements of the first LIDAR sensor are carried out in respective first measurement time windows, at a beginning of which a first measurement beam is emitted by the first LIDAR sensor and a check is made as to whether at least one reflected beam portion of the first measurement beam is detected within the respective first measurement time windows,
   wherein the measurements of the at least one second LIDAR sensor are carried out in respective second measurement time windows, at a beginning of which a second measurement beam is emitted by the at least one second LIDAR sensor and a check is made as to whether at least one reflected beam portion of the second measurement beam is detected within the respective second measurement time windows,
   wherein the first LIDAR sensor and the at least one second LIDAR sensor are operated in a synchronized manner such that the first measurement time windows and the second measurement time windows do not overlap temporally,
   wherein the first LIDAR sensor has a first detector, which is read out during the first measurement time windows, and the at least one second LIDAR sensor has a second detector, which is read out during the second measurement time windows, wherein the first detector is also read out during the second measurement time windows and when a light pulse is detected by the first LIDAR sensor within one of the second measurement time windows, the detected light pulse is classified as originating from the at least one second LIDAR sensor,
   wherein, in an event of the light pulse being detected by the first LIDAR sensor during at least one second measurement time window, a position of an object point is determined based on a function of a position of the at least one second LIDAR sensor relative to the first LIDAR sensor and based on a function of solid angle information, and wherein the solid angle information is provided by a radiation direction of the at least one second LIDAR sensor during the at least one second measurement time window.

2. The method as claimed in claim 1, wherein a synchronization signal is repeatedly provided, which is used to synchronize an operation of the first LIDAR sensor and the at least one second LIDAR sensor.

3. The method as claimed in claim 1, wherein the first LIDAR sensor and the at least one second LIDAR sensor are operated in a synchronized manner such that the first and second measurement time windows are temporally arranged with respect to each other in a specified sequence.

4. The method as claimed in claim 1, wherein the first LIDAR sensor and the at least one second LIDAR sensor are operated in a synchronized manner such that the first and second measurement time windows are temporally arranged with respect to each other in a random sequence.

5. The method as claimed in claim 1, wherein consecutive first measurement time windows each have a first predetermined time interval relative to each other, which is multiple times larger than any one of the first measurement time windows.

6. The method as claimed in claim 1, wherein a temporal length of the respective first and/or second measurement time windows is fixed and constant.

7. The method as claimed in claim 1, wherein a temporal length of the respective first and/or second measurement time windows is dynamically varied as a function of a distance of an object detected during a measurement.

8. The method as claimed in claim 1, wherein a temporal length of the respective first and/or second measurement time windows is determined as a function of a number of LIDAR sensors of the sensor arrangement.

9. The method as claimed in claim 1, wherein the solid angle information is acquired by the first detector of the first LIDAR sensor.

10. A sensor arrangement comprising:
a first LIDAR sensor and at least one second LIDAR sensor,
wherein the first LIDAR sensor and the at least one second LIDAR sensor are each designed to repeatedly carry out respective measurements such that the measurements of the first LIDAR sensor are carried out in respective first measurement time windows, at a beginning of which a first measurement beam is emitted by the first LIDAR sensor and a check is made as to whether at least one reflected beam portion of the first measurement beam is detected within the respective first measurement time windows, and such that the measurements of the at least one second LIDAR sensor are carried out in respective second measurement time windows, at a beginning of which a second measurement beam is emitted by the at least one second LIDAR sensor and a check is made as to whether at least one reflected beam portion of the second measurement beam is detected within the respective second measurement time windows,
wherein the sensor arrangement is designed to synchronize the first and the least one second LIDAR sensors such that the first measurement time windows and the second measurement time windows do not overlap temporally,
wherein the first LIDAR sensor has a first detector configured to be read out during the first measurement time windows and the at least one second LIDAR sensor has a second detector configured to be read out during the second measurement time windows, wherein the first detector is also configured to be read out during the second measurement time windows and when a light pulse is detected by the first LIDAR sensor within one of the second measurement time windows the detected light pulse is classified as originating from the at least one second LIDAR sensor,
wherein, in an event of the light pulse being detected by the first LIDAR sensor during at least one second measurement time window, a position of an object point is determined based on a function of a position of the at least one second LIDAR sensor relative to the first LIDAR sensor and a function of solid angle information, and
wherein the solid angle information is provided by a radiation direction of the at least one second LIDAR sensor during the at least one second measurement time window.

11. The sensor arrangement as claimed in claim 10, wherein the solid angle information is acquired by the first detector of the first LIDAR sensor.

12. The sensor arrangement as claimed in claim 10, wherein a synchronization signal is repeatedly provided, which is used to synchronize an operation of the first LIDAR sensor and the at least one second LIDAR sensor.

13. The sensor arrangement as claimed in claim 10, wherein the first LIDAR sensor and the at least one second LIDAR sensor are configured to operate in a synchronized manner such that the first and second measurement time windows are temporally arranged with respect to each other in a specified sequence.

14. The sensor arrangement as claimed in claim 10, wherein the first LIDAR sensor and the at least one second LIDAR sensor are configured to operate in a synchronized manner such that the first and second measurement time windows are temporally arranged with respect to each other in a random sequence.

15. The sensor arrangement as claimed in claim 10, wherein consecutive first measurement time windows each have a first predetermined time interval relative to each other, which is multiple times larger than any one of the first measurement time windows.

16. The sensor arrangement as claimed in claim 10, wherein a temporal length of the respective first and/or second measurement time windows is fixed and constant.

17. The sensor arrangement as claimed in claim 10, wherein a temporal length of the respective first and/or second measurement time windows is dynamically varied as a function of a distance of an object detected during a measurement.

18. The sensor arrangement as claimed in claim 10, wherein a temporal length of the respective first and/or second measurement time windows is determined as a function of a number of LIDAR sensors of the sensor arrangement.

* * * * *